Figure 1:
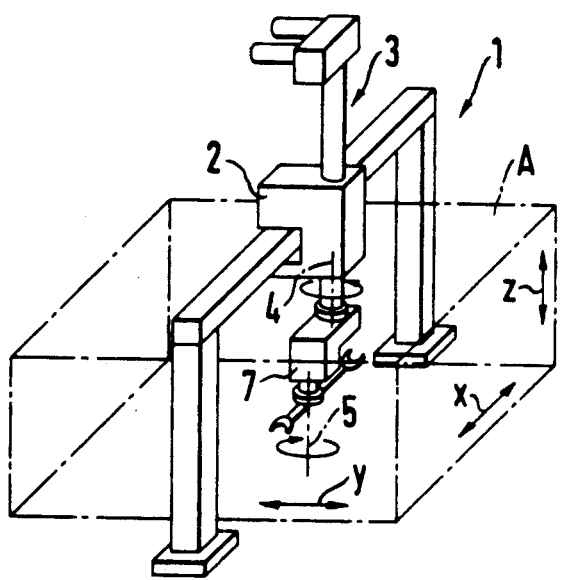

United States Patent [19]

Massmann

[11] Patent Number: 5,006,036

[45] Date of Patent: * Apr. 9, 1991

[54] PORTAL SYSTEM

[76] Inventor: Hans-Joachim Massmann, Gottfried-Keller-Strasse 10, 6953, Gundelsheim, Fed. Rep. of Germany

[*] Notice: The portion of the term of this patent subsequent to May 23, 2006 has been disclaimed.

[21] Appl. No.: 291,085

[22] Filed: Dec. 27, 1988

Related U.S. Application Data

[63] Continuation of Ser. No. 70,474, Jul. 7, 1988, Pat. No. 4,832,563.

[30] Foreign Application Priority Data

Aug. 6, 1986 [DE] Fed. Rep. of Germany ....... 3626610

[51] Int. Cl.⁵ .................................................. B25J 5/04
[52] U.S. Cl. .................................. 414/744.5; 414/751; 414/736; 901/17
[58] Field of Search ............... 414/749, 751, 753, 736, 414/744.5; 901/26, 16, 17

[56] References Cited

U.S. PATENT DOCUMENTS 3,922,930 12/1975 Fletcher et al. ................... 901/26 X
4,688,984 8/1987 Nakashima et al. .............. 901/26 X

FOREIGN PATENT DOCUMENTS 1314746 12/1962 France ................................ 414/736
0120480 9/1980 Japan ..................................... 901/16

Primary Examiner—Robert J. Spar
Assistant Examiner—Donald W. Underwood
Attorney, Agent, or Firm—Townsend and Townsend

[57] ABSTRACT

A portal system is described which consists of two translational axes and two rotary axes which are so arranged and controlled that every point within a cubic working space can be computed and reached. As a result of this special kinematic construction the total complexity for the frame and also the mechanical complexity and cost are substnatially reduced in comparison to customery portal systems.

12 Claims, 2 Drawing Sheets

PORTAL SYSTEM

This is a continuation of application Ser. No. 70,474, filed July 7, 1988 now U.S. Pat. No. 4,832,563.

The invention relates to a portal system for multidimensional movement of transport and/or working means in a predeterminable working space, the portal system comprising a portal intended to be fixedly mounted at a mounting location, a basic unit movable over the portal length in the x-direction, and also means associated with the basic unit and movable vertically in the z-direction and horizontally in the y-direction.

Portal systems and stationary robots are in extensive use in practice. They are used for moving transport means and working means in a controlled manner within a predetermined space.

The known portal systems however involve considerable mechanical and electrical complexity when the requirement exists to move in a steered manner to any point in a cubic space. If the space to be served exceeds a certain size then it is necessary with the known arrangements, in order to avoid mechanical overloading of the system, to use double-portal arrangements. These involve two elongate guide rails which are connected together via transverse beams, and accordingly also require a double-carriage arrangement for the movement of the system in a horizontal direction.

The principal object underlying the present invention is to develop a portal system of the initially named kind in such a way that the mechanical and electrical complexity for the movement of transport means and/or working means required to serve a comparatively large cubic space is minimised as far as possible.

This object is satisfied in accordance with the invention in that the means which is movable in the z-direction is combined with the basic unit and is coupled at the working space side via a rotational axle with an arrangement having at least one further rotational axle, said arrangement being associated with the transport means and/or the working means for steering towards any desired points of the working space in the y-direction.

This arrangement ensures that it is possible to compute and steer towards each point within a cubic working space, with it in particular also being possible to effect a straightline movement in the y-direction with a relatively small mass of the apparatus, by coupling the movements of the basic unit in the X-direction with the movement of the arrangement having the two mutually displaced rotational axes.

The special kinematic construction of the portal system defined by the features of claim 1 leads to a substantial reduction of the frame complexity and also of the complexity of the guidance and driving system, and indeed also of the electromechanical complexity. Moreover the total mass which has to be moved is smaller and thus also the energy requirement for the changing dynamic movements.

The basic unit is preferably constructed as a movable carriage, the special feature of which lies in the fact that the movable part of the means or structure associated with the z-direction is guided in this carriage, with its associated drive being accommodated in this carriage.

Having regard to the attainment of an arrangement which is particularly favourable with regard to the distribution of forces in the system and has minimal dimensions in the working space, it is of advantage for the drives for movement about the rotational axes to be mounted preferably at the end remote from the working space of the movable part of the means or structure associated with the z-direction.

In this arrangement the drives are expediently connected with the rotational axles via a transmission system, that includes coaxially disposed and rotatably journalled sleeve parts, at least in the region of the part guided in the basic unit of the means movable in the z-direction.

The two mutually displaced rotational axes which extend parallel to one another are defined within a swivellable housing part which is connected with the associated drive via a sleeve part which brings about the controlled swivelling of the housing part, and also via a transmission.

In a further embodiment of the invention the housing associated with the two mutually parallel rotational axes is subdivided into a first housng part and also a second housing part; and both housing parts are connected together via a horizontal double-rotational axis arrangement.

In this manner pivoting of the output side rotational axis over 360° is possible, so that any desired changes of position of the transport means or working means in space are possible via this third coupled rotary axis.

The portal system of the invention can be connected with positioning means actuatable via a pressure medium so that in this way positional changes of the transport means or working means can be effected independently of the movement of the system.

The rotational axes or axles can furthermore take on further functions in addition to their function of describing the path of movement. In particular they can in practice be additionally exploited so that the portal system can be used as a changer for transport means and working means. An example is the use as a double arm changer for tool or workpiece changing. The combination of movements along translational axes and around rotational axes, made possible by the portal system of the invention, enables linear movements and path movements to be carried out in a plane as well as in space precisely and rapidly, and indeed with a degree of mechanical and electrical complexity which is substantially reduced in comparison to customary arrangements.

Figure 2:
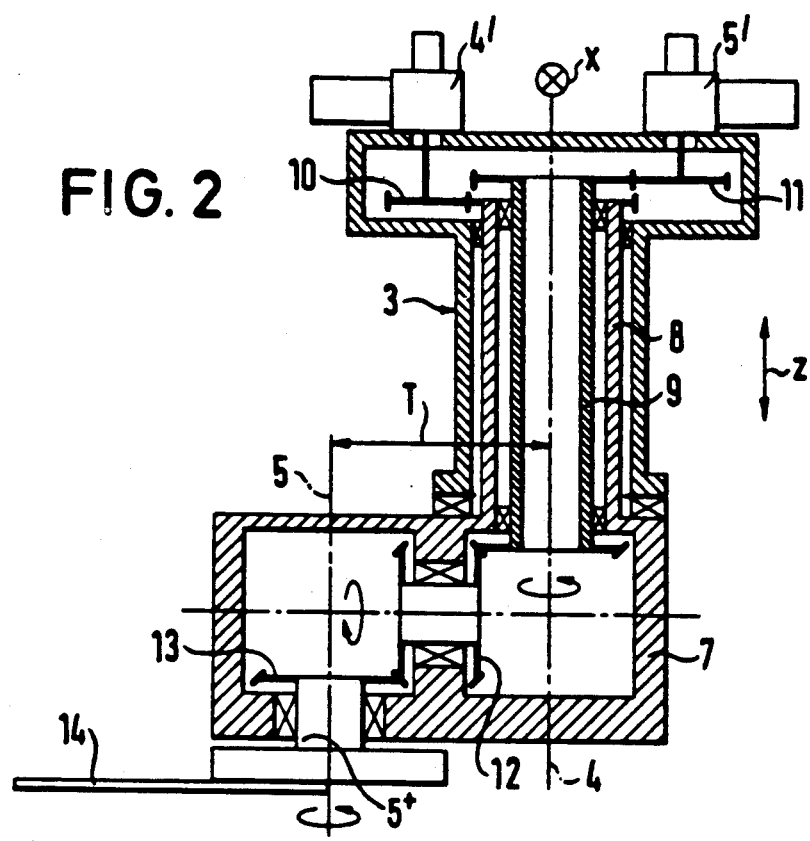
Figure 3:
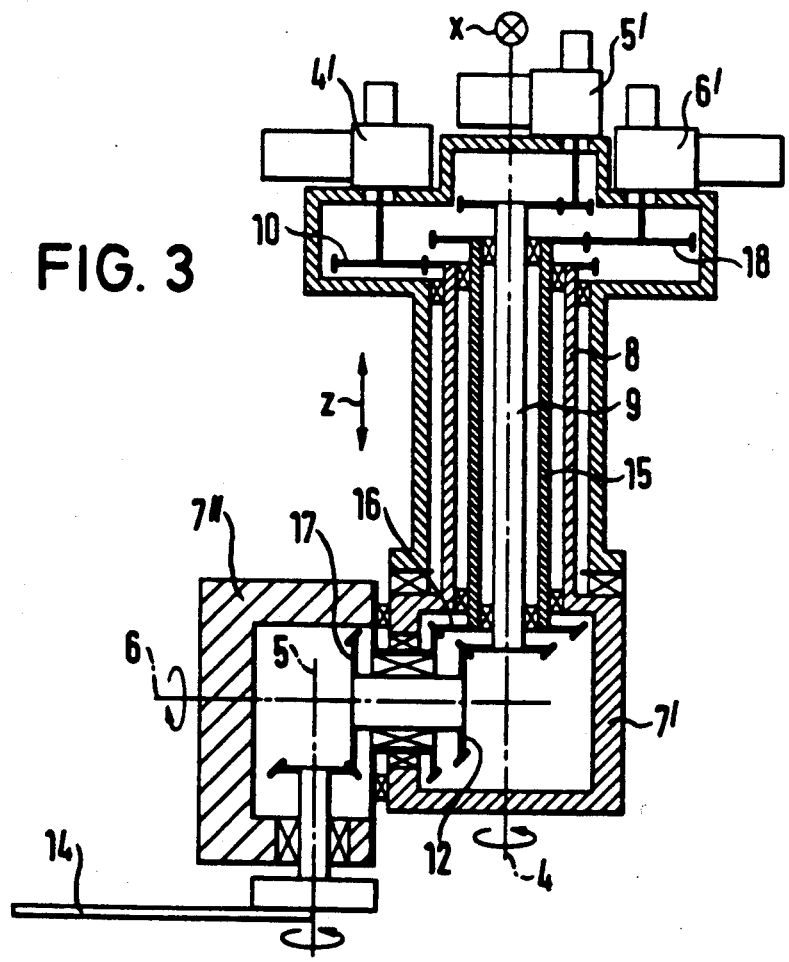

The invention will now be described in more detail with reference to embodiments and to the drawings in which are shown:

FIG. 1 a schematic representation to explain basic construction of a portal system in accordance with the invention, FIG. 2 a schematic sectional representation of the movable units of the system of FIG. 1, and FIG. 3 a development of the basic arrangement of FIG. 2.

FIG. 1 shows a portal 1 with two vertical beams and a horizontal beam which connects the vertical beams to one another, with a basic unit 2 being movable on the horizontal beam in accordance with the x-direction.

A structure 3 which is movable in accordance with the z-axis is guided in this basic unit 2.

A housing part 7 is pivotally mounted at the lower end of this structure 3 for rotation about a vertical axis 4 and contains a bearing arrangement defining a further rotational axis 5 which is spaced apart from and parallel to the rotational axis 4. The drives 4', 5' associated with the two rotational axes 4, 5 are movably provided at the upper end of the structure 3 which is movable with the attached items as a whole in the z-direction.

By means of the basic constructional arrangement which has been described, and which is shown in FIG. 1, it is possible to steer to any point within the cubic working space A (which may take the form of a parallelopiped with sides of different lengths).

FIG. 2 shows the construction of the combined structure or arrangement which is movable on the horizontal beam of the portal. The basic unit 2 which is movable in the x-direction—as indicated—is not shown in detail in order to make the representation clearer.

The entire structure characterised by the reference numeral 3 is vertically movable in the base or basic unit 2, i.e. in the z-direction. This structure 3 is preferably constructed in the guide region of mutually concentric parts.

Drives 4', 5', which are associated with the rotational axes 4 and 5 respectively, are mounted on an external housing, i.e. on a carrier housing. The drive 4' is coupled via a transmission (gearing) 10 with a sleeve part 8 which is fixedly connected with the housing part 7 associated with the two rotational axes 4, 5. This housing part 7 can thus swivel or be rotated by means of the drive 4' about the axis 4, defined by the central longitudinal axis of the sleeve part 8. The sleeve part 8 which is supported on bearings in the arrangement 3 can be thought of as a rotational axle for the housing part 7.

The drive 5' is coupled via a transmission (gearing) 11 with a further sleeve part 9 which is coaxially arranged within the already mentioned sleeve part 8 and which is in turn connected via a bevel gear drive 12 with a horizontal stub axle which drives the rotational axle 5+ via a further bevel gear transmission 13. The central longitudinal axis of the sleeve part 9 is coincident with the central longitudinal axis of the sleeve part 8 and thus with the axis of rotation 4. The rotational axle 5+ is, as previously mentioned, supported in bearings in the housing part 7 for rotation about the axis 5. Furthermore, working or actuating means or members 14 is/are secured to the rotational axle 5+ which rotates about the axis 5.

The spacing between the two parallel mutually displaced, rotational axes 4, 5 is designated by T in FIG. 2. It can be seen that the arrangements schematically shown in FIG. 2 is on the one hand movable via the basic unit 2 in the x-direction and also in the z-direction; and in that movements in the y-direction can be selectively carried out by appropriate control of the degree of rotation about the rotational axes 4 and 5.

The variant of FIG. 3 is distinguished from that of the embodiment of FIG. 2 by the presence of the third rotary axis 6.

For this purpose the housing containing the two rotary axes 4, 5 of FIG. 2 is subdivided into a first housing part 7' and into a second housing part 7" and pivotal movement is possible between these two housing parts about the horizontal axis 6. This pivotal movement is controlled by a drive 6' arranged adjacent the drives 4', 5'. The drive 6' is connected with the housing part 7" via a transmission (gearing) 18 and via a sleeve part 15 which extends coaxial to the sleeve parts 8, 9 associated with the other axes of rotation and also via a bevel gear transmission 16. This makes it possible to pivot the housing part 7" about the horizontally extending axis of rotation 6, whereby the rotational axle 5+ is simultaneously pivoted which is in turn drivable via a bevel gear transmission 17 located in the housing part 7".

This additional third, coupled rotary axis 6 makes any desired positional changes of transport means or working means in space possible and is also advantageous in many applications, in particular also with respect to the speeds of movement and control speeds which can be obtained.

Although not shown in the drawings it will be appreciated that the structure 3 which includes a columnar portion of substantially constant and preferably circular cross-section can be moved vertically within the basic unit 2 by various means. E.g. a rack may be attached to the side of the columnar portion with the teeth of the rack engaging with a motor driven pinion mounted in the basic unit. Alternatively the columnar portion could be constructed as a hollow, stepped piston movable by a pressure fluid within a cylinder formed in the basic unit 2.

It will also be appreciated that the "members" 14 attached to the rotational axle 5+ can take a wide variety of different forms They can for example take the form of a pair of tongs or robots hand. Alternatively the members 14 may be a tool holder. Such tongs, hands and tool holders generally require some actuating movement for the grasping or releasing action associated with them and this can be provided in various ways, e.g. by electromagnetic or pneumatic actuators. Also the members may themselves be extensible and retractable, e.g. through the use of pressure fluid operated piston-in-cylinder units.

I claim:

1. Portal system for the multidimensional movement of a holder member in at least x-, y- and z directions to selectable positions within a working space, the portal system comprising:
   (a) a portal having a crossbeam extending in said x-direction with mounting means for mounting said crossbeam at a fixed location;
   (b) a first unit movable along said crossbeam in said x-direction;
   (c) means for moving said first unit in said x-direction;
   (d) a second unit supported by said first unit for movement relative to said first unit in said z-direction; and
   (e) means for moving said second unit in said z-direction;
   said second unit comprising:
   (i) a first hollow housing part movable in said z-direction relative to said first unit;
   (ii) a first shaft having a first axis extending in said z-direction and having a first end and a second end, and being rotatably disposed within said first hollow housing part;
   (iii) a second hollow housing part at said first end of said first shaft and rotatable with said first shaft about said first axis;
   (iv) an axle rotatably disposed in said second housing part and offset to the side of said axis, with said holding member being provided at an end of said axle;
   (v) a first motor mounted at said first housing part and drivingly connectable to said second end of said shaft;
   (vi) a second motor mounted at said first housing part for driving said axle; and
   (vii) a first transmission means extending from said second motor through said first and second housing parts to said axle for rotation of said axle, whereby movement of said holder in said y- direction is achieved by rotation of said second housing part about said axis under the influence of said first motor and by rotation of said axle by said second motor.

2. A portal system in accordance with claim 1 wherein said x-, y-, and z-directions are perpendicular to each other.

3. A portal system in accordance with claim 1, wherein said second housing part comprises first and second housing portions, said first housing portion being connected to said first end of said shaft and said second housing portion being rotatable relative to said first housing portion about an axis of rotation disposed in a plane parallel to said x-and y-directions and spaced from said holder member.

4. A portal system in accordance with claim 3, wherein a third motor is mounted on said first housing part and is drivingly connectable to said second housing portion by a second transmission means disposed within said first shaft.

5. A portal system in accordance with claim 4, wherein said second transmission means comprises a second shaft disposed within said first shaft and wherein said first transmission means extends within said second shaft.

6. A portal system in accordance with claim 1, wherein said first transmission means comprises a further shaft coaxially disposed within said first shaft.

7. A portal system in accordance with claim 6, wherein said further shaft has a first end and a second end, wherein means is provided for drivingly connecting said second motor to said first end of said further shaft, wherein a first bevel gear is connected to said second end of said further shaft and is drivingly connected to a second bevel gear on said axle.

8. A portal system in accordance with claim 7, wherein said first bevel gear is drivingly connected to said second bevel gear through first and second intermediate bevel gears disposed on a cross-shaft, said cross-shaft being rotatably mounted within said second housing part.

9. A portal system in accordance with claim 5, wherein said first transmission means comprises a third shaft coaxially disposed within said first and second shafts, wherein respective bevel gears are connected to said second and third shafts within said first housing portion, with the said bevel gear connected to said second shaft being drivingly connected to a further bevel gear mounted on said second housing portion, and with the said bevel gear connected to said third shaft being drivingly connected with another bevel gear mounted on said axle via intermediate bevel gears mounted on opposite ends of a cross-shaft extending from said first housing portion into said second housing portion.

10. A portal system in accordance with claim 1, wherein said holder member is adapted to hold a tool.

11. A portal system in accordance with claim 1, wherein said holder member is adapted to hold a workpiece.

12. A portal system according to claim 1 wherein the portal is positioned at a point spaced from ends of the work space in the y-direction.

* * * * *